Dec. 24, 1935.  M. F. PERRY, JR  2,025,472

AUTOMATIC HYDRAULIC CLUTCH TRANSMISSION

Filed Oct. 5, 1934   4 Sheets-Sheet 1

Inventor
*Manuel F. Perry, Jr.*

By *Clarence A. O'Brien*
Attorney

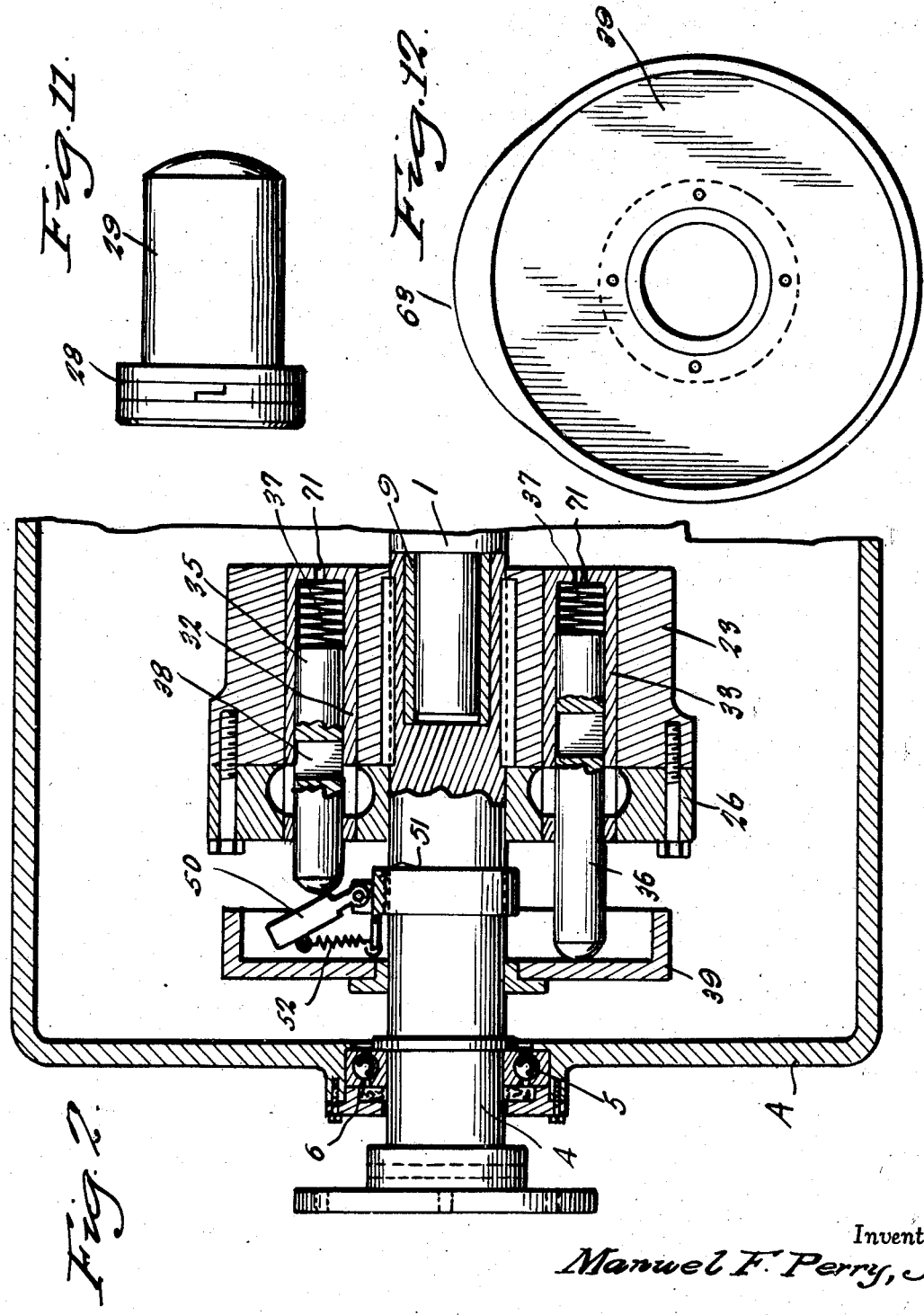

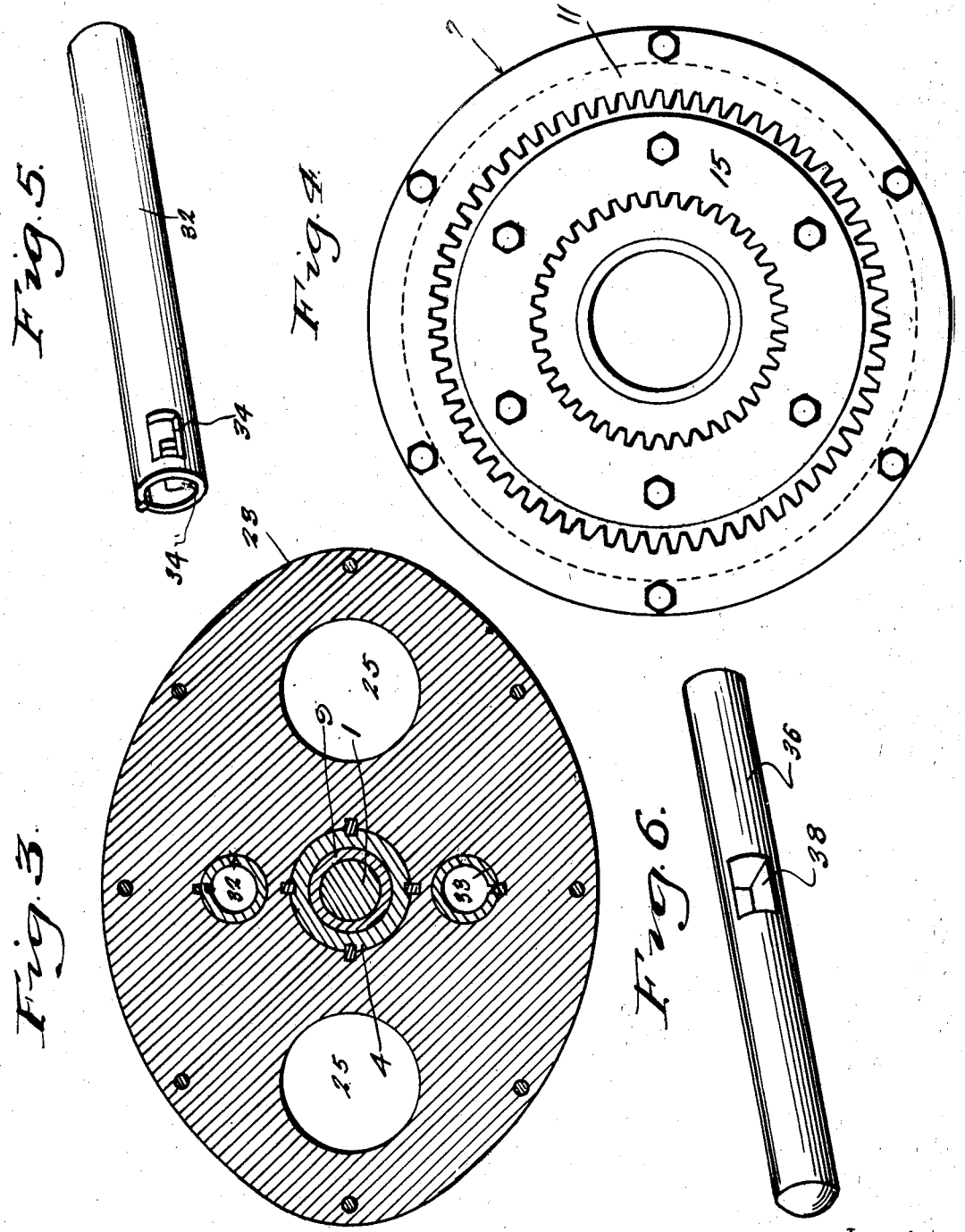

Dec. 24, 1935.   M. F. PERRY, JR   2,025,472
AUTOMATIC HYDRAULIC CLUTCH TRANSMISSION
Filed Oct. 5, 1934   4 Sheets-Sheet 4
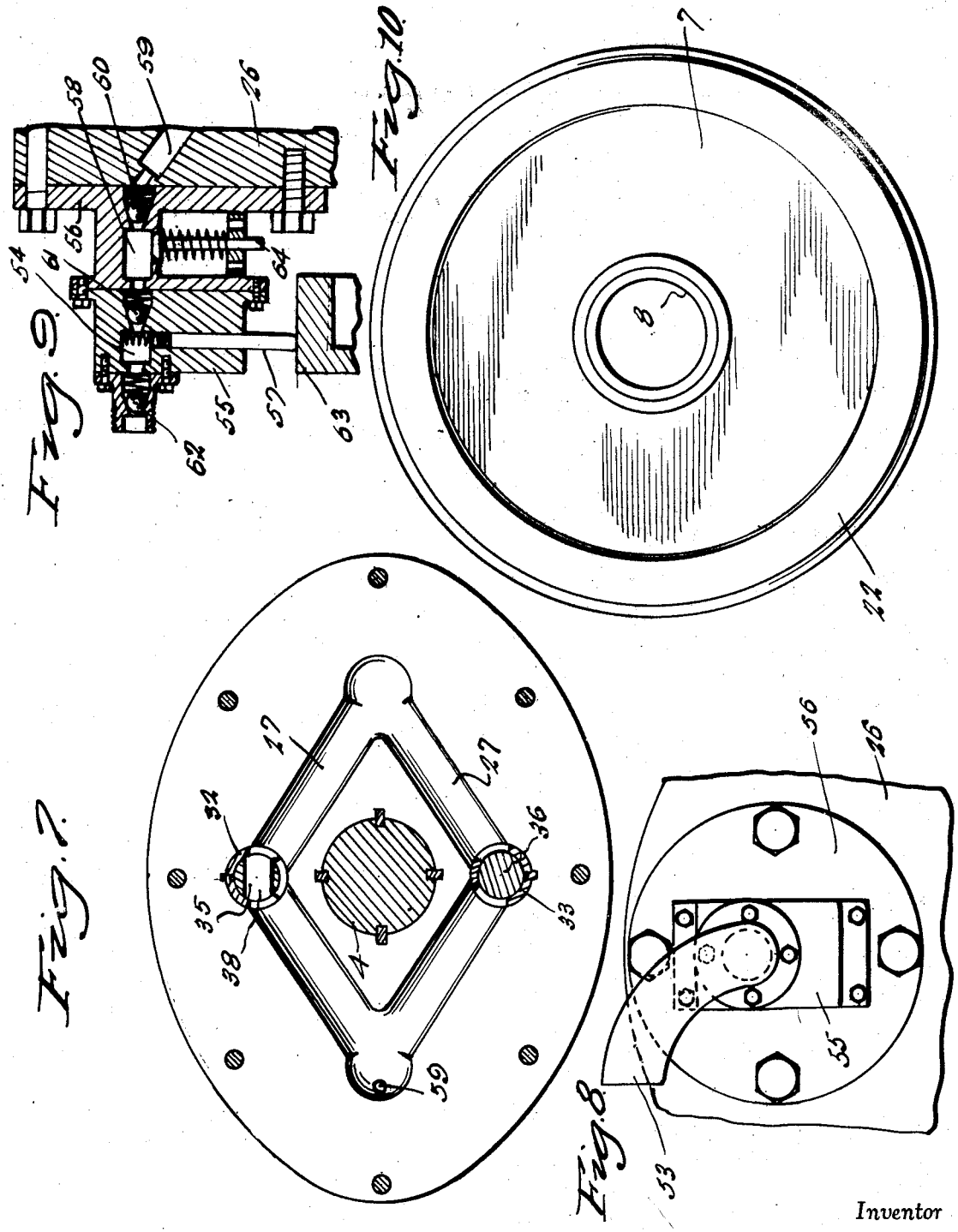
Inventor
Manuel F. Perry, Jr
By Clarence A. O'Brien
Attorney Patented Dec. 24, 1935

2,025,472

UNITED STATES PATENT OFFICE 2,025,472

AUTOMATIC HYDRAULIC CLUTCH-TRANSMISSION

Manuel F. Perry, Jr., New Bedford, Mass.

Application October 5, 1934, Serial No. 747,059

3 Claims. (Cl. 192—59)

This invention relates to an automatic hydraulic clutch-transmission, the general object of the invention being to provide a cam on the drive shaft and a cylinder-containing member on the driven shaft, the cylinders of which are connected together by a fluid passage and the pistons in the cylinders having parts engaging the cam so that the pistons are reciprocated by the cam, with means for controlling the flow of fluid through the passage, whereby when the passage is closed the pistons cannot reciprocate and the driven shaft will be driven at the same speed as the drive shaft, or when the passage is partly closed, the speed ratio between the two shafts will vary according to the checking of the flow of fluid through the passage, the driven shaft of the piston-carrying member remaining idle when the passage is fully open for in this case, the pistons are free to reciprocate with the fluid flowing back and forth between the cylinders.

Another object of the invention is to provide a fluid flow controlling means so that the fluid can be controlled either automatically or manually or both automatically and manually.

By having the cylinders connected together by a passage which has no other outlet excepting into the cylinders, there is no loss of hydraulic pressure as the power that is absorbed in one cylinder is returned to the opposite piston in the engine, thus making the transmission efficient without loss of power.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Fig. 2 is a section on line 2—2 of Fig. 1.

Fig. 3 is a section on line 3—3 of Fig. 1.

Fig. 4 is a view of the front face of the cam member.

Fig. 5 is a view of one of the valve sleeves.

Fig. 6 is a view of one of the valves.

Fig. 7 is a section on line 7—7 of Fig. 1.

Fig. 8 is a fragmentary elevation of the scoop and its pump.

Fig. 9 is a vertical sectional view through these parts.

Fig. 10 is a view of the cam face of the cam member.

Fig. 11 is a view of one of the pistons.

Fig. 12 is a view of the pump cam and valve-clutch control plate.

Figure 1:
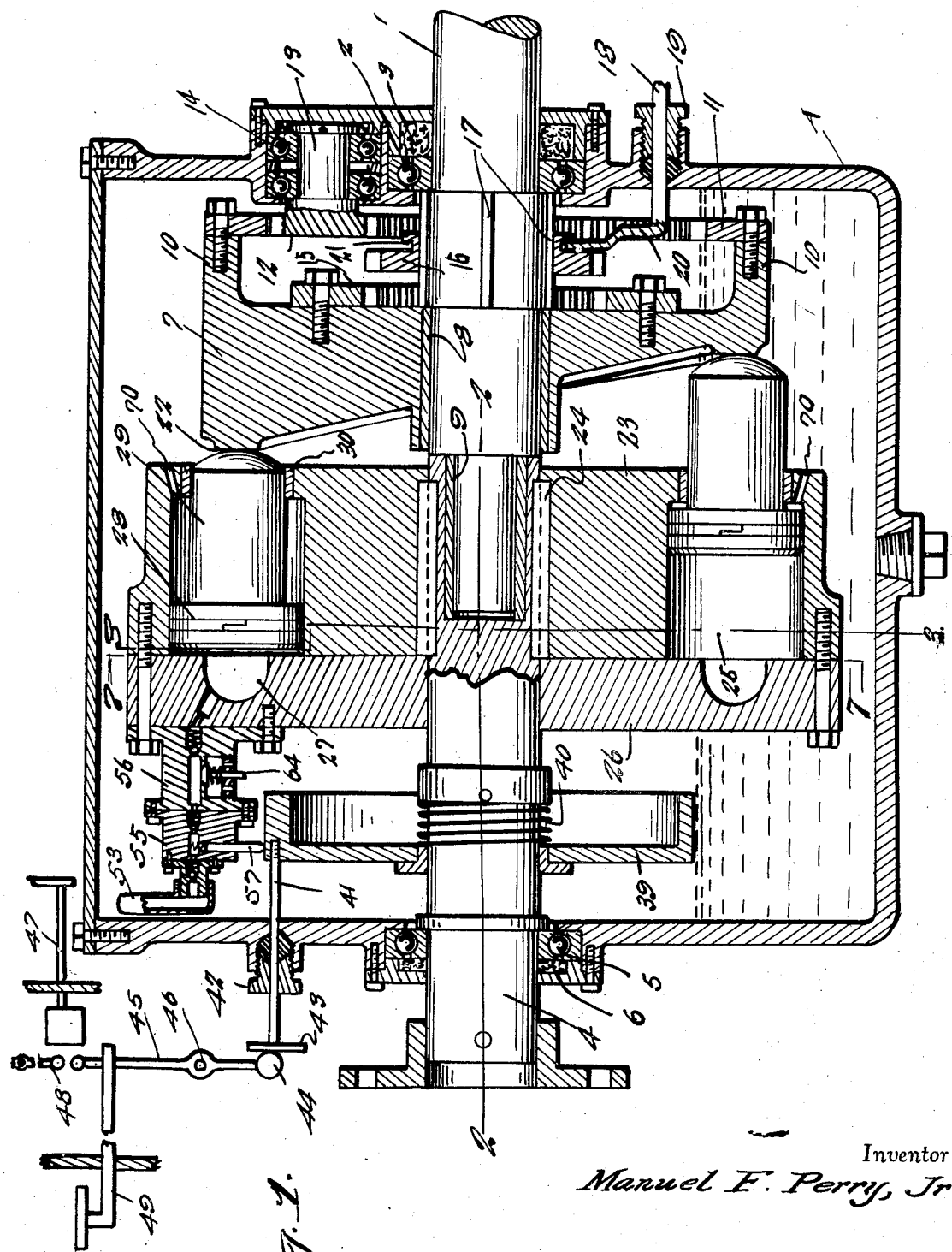
Fig. 1 is a vertical sectional view taken longitudinally through the invention.

In these drawings, the letter A indicates a housing and the numeral 1 indicates the drive shaft which extends into the front of the housing and is provided with the anti-friction means 2 and the packing means 3, the driven shaft being shown at 4 and extends into the rear part of the housing and is also provided with the anti-friction means 5 and the packing means 6. The front end of the shaft 4 is provided with a socket for receiving the reduced rear end of the shaft 1 and a cam member 7 is rotatably arranged on the shaft 1 and is located in the housing, a bushing 8 being located on the shaft 1 for the cam member 7 and a bushing 9 is located in the socket of the shaft 4 and surrounds the reduced end of the shaft 1. The front face of the cam member 7 is provided with a forwardly extending flange 10 to which is fastened a ring gear 11 which forms part of the reversing means and is in constant mesh with an idle gear 12, the stub shaft 13 of which is journaled in the front end of the housing and is provided with anti-friction means 14. A smaller ring gear 15 is connected to the front face of the cam member within the space formed by the flange 10 and a gear 16 is slidably but non-rotatably connected to the shaft 1 by the keys 17, this gear 16 being movable on the key part of the shaft 1 by any suitable means connected to the rod 18 so that said gear 16 can be moved into mesh with either the gear 15 or the idle gear 12, it being understood that when the gear 15 is in mesh with the idle gear, the cam member will be revolved in one direction to drive the shaft 4, by means to be described, in reverse direction and that when the gear 16 is in mesh with the gear 15, the cam member 7 will be revolved in an opposite direction to drive the shaft 4 in a forward direction. The rod 18 passes through a packing gland 19 and has its bent end 20 engaging a groove 21 in the gear 16.

The rear face of the cam member 7 is formed with an annular or ring-shaped cam 22, said face and the cam sloping as shown in Fig. 1.

A cylinder-carrying member or body 23 is attached to the shaft 4 such as by the keys 24, the cylinders of the body being shown at 25. A head or plate 26 is bolted in the rear face of the body 23 and acts to close the rear ends of the cylinders and passages 27 connect the rear ends of the cylinders together, the passages being arranged in the plate or head 26 and when two valves and two pistons are used, I prefer to arrange these passages as shown in Fig. 7. A piston 28 is arranged in each cylinder, the piston being provided with the usual ring or rings and said pistons are formed with the push rods 29 which pass through the front face of the body and have their front ends rounded to engage cam ring 22. A bushing 30 is preferably placed in each opening through which the push rod passes.

Thus, it will be seen that as the cam member 7 is rotated, the piston will be reciprocated, if the passages 27 are open for as one piston is moved inwardly by the cam ring, the fluid forced from the cylinder of said piston will flow through the passages into the other cylinder and project such piston as shown in Fig. 1. When the passages are open the reciprocation of the pistons by the cam member will of course not move the body 23 and the shaft 4 but when the passages are fully closed, the fluid will be trapped between one piston and the passage closing member, thus causing the two shafts 1 and 4 to revolve together at the same speed. Due to the fact that as the piston cannot compress the fluid, the cam ring literally wedges against the push rod of the piston, thus turning the two units together. It will also be understood that if the passages are partly closed, the speed ratio between the two shafts will vary in accordance with the amount of closure of the passages.

It will also be seen that by having the cylinders connected together by the passages loss of hydraulic pressure is prevented as pressure exerted against the fluid by one piston presses the other piston against the cam member 7.

A sleeve 32 is placed in aligned holes formed in the body 23 and the head 26, the holes intersecting one of the passages and a similar sleeve 33 is placed in aligned holes in the body and head which intersect the other passage as shown in Figs. 2 and 7. Each sleeve is formed with the openings 34 which register with the passage and a valve 35 is slidably arranged in the sleeve 32 and a valve 36 in the sleeve 33. Each valve is pressed outwardly by a spring 37 and each valve has a transverse opening 38 therein, said opening when in register with a passage, opening the passage so that fluid can pass from one cylinder to the other.

A flanged plate 39 is slidably arranged on the shaft 4 and said plate is normally held in a rear position by a spring 40. This plate 39 engages the valve 36 and when the plate 39 is moved forwardly, it will close the valve 36 but when in rearward position, the valve will be opened by a spring 37. The plate is manually controlled by a rod 41 attached to a part of the plate and passes through the rear end of the housing A, the housing at this point being provided with a gland 42 and the rear end of the rod carries a head 43 which is engaged by a rounded end 44 of a lever 45 pivoted to a suitable support at 46 and having its upper end adapted to be engaged by the accelerator 47 which also controls the throttle of a carburetor or other source of fuel through means of the arm 48. Fig. 1 also shows a hand control 49 for moving the lever 45 so that the plate 39 can be moved independently of the accelerator.

The other valve 35 is automatically controlled by a governor 50, shown as a centrifugal governor, but which may be of any type. This governor is shown as being pivoted to a collar 51 on the shaft 4 and normally held in inoperative position by a spring 52.

Thus the valve 36 is manually operated and will control the flow of fluid from one cylinder to the other, while the valve 35 is automatically operated by a governor so that this valve 35 will automatically control the flow of fluid from one cylinder to the other in accordance with the speed of rotation of the driven shaft 4 and the load on said shaft.

I prefer to use lubricant as the hydraulic fluid so that this lubricant can be taken from the sump in the housing A and in doing this, I provide a curved scoop 53 for scooping up the lubricant from the sump and delivering it into a pump chamber 54 formed in a body 55 supported on a base 56 attached to the rear face of the head 26 and the parts are adjacent the edge of said head. A spring-pressed pump plunger 57 acts to force the fluid or lubricant from the chamber 54 into a chamber 58 in the base 56 from which the fluid passes into a passage 27 through the passages 59 formed in a part of the head 26 and the base 56. A spring-pressed check valve 60 prevents the return flow of the fluid from a passage 27 into the chamber 58 and a similar valve 61 prevents the return flow of fluid from the chamber 58 into the pump chamber 54 while a similar valve 62 prevents the return flow of the fluid from the chamber 54 into the spout 53. The pump plunger 57 is operated by a cam 63 on a portion of the periphery of the plate 39. A spring-closed valve 64 controls a port in the chamber 58 and acts to return the fluid to the sump when the passages 27 and the cylinders do not need fluid.

This pump assembly keeps the system full of fluid and safeguards the system against any leakage past the pistons or against temperature conditions. For motor vehicles which will require the transmission being in direct drive, a goodly portion of the time the relief valve 64 can be set at fifty to one hundred pounds because when in direct drive one cylinder contains all the pressures and the other none. In this case, the pump will keep the cylinder that is not under pressure full. The other cylinder, since it is under the full driving pressure, will not need refilling. In other words, if the fluid under pressure should leak past the piston, the piston would advance and the opposite piston would retreat in direct proportion. Then the pump will force fluid into the retreating cylinder. When the cylinder does not require additional fluid, the fluid forced from the pump passes through the relief valve back into the sump.

For conditions such as high speed turbines where a direct drive is not feasible, the strength of the relief valve would have to be correspondingly higher since the pump will have to work against much higher pressures.

The governor controlled valve 35 acts to control the transmission from the low speed drive to direct drive as the speed of the vehicle increases.

The valve 36 is in reality a clutch taking the load on gradually and without shock. By referring to the drawings, it can be seen that when the accelerator is depressed, the valve 36 closes by means of levers moving the valve control plate 39. It is so arranged that when closed and the accelerator is depressed further, the throttle will open and the engine will develop more speed and power.

When the invention is used in motor vehicles and the like, the gear 16 remains in mesh with the gear 15 for all forward speeds or for dead stops and it is not necessary to move these gears out of mesh every time one stops. The only time it is necessary to take the gears out of mesh is when one wishes to reverse.

After the motor is started, the accelerator is depressed and then the speed of the vehicle is controlled automatically by the governor which changes the ratios as the vehicle picks up speed.

The device may be used as the clutch or the transmission or as both and its use eliminates the conventional clutch when the valve 36 is used and the invention can be used on motor vehicles, trains, boats, turbines or for anything requiring a device for the taking on of loads or for automatically or manually controlled changes of speed ratios.

Holes 70 are formed in the outer ends of the cylinders 25 and holes 71 in the spring ends of the valve sleeves, these holes permitting any fluid which should leak past the pistons or valves to escape back into the sump and they also act as air breathers.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. In an apparatus of the class described, a housing, alined drive and driven shafts extending into the housing, a circular body carried by the drive shaft and having an annular cam on its rear face, a second circular body carried by the driven shaft and having its front face located adjacent the rear face of the first body, said second body having a pair of oppositely arranged cylinders therein, one end of each of which opens out through the front face of the body, the other ends of the cylinders being closed, a pair of closed conduits connecting said last mentioned ends of the cylinders together, said conduits containing fluid, a piston in each cylinder having an end projecting from the open end of the cylinder and engaging the cam, a manually operated valve for controlling one conduit and a governor-operated valve controlling the other conduit.

2. In an apparatus of the class described, a housing, alined drive and driven shafts extending into the housing, a circular body carried by the drive shaft and having an annular cam on its rear face, a second circular body carried by the driven shaft and having its front face located adjacent the rear face of the first body, said second body having a pair of oppositely arranged cylinders therein, one end of each of which opens out through the front face of the body, the other ends of the cylinders being closed, a pair of closed conduits connecting said last mentioned ends of the cylinders together, said conduits containing fluid, a piston in each cylinder having an end projecting from the open end of the cylinder and engaging the cam, a manually-operated valve for controlling one conduit and a governor-operated valve controlling the other conduit, and an accelerator associated with the manually-controlled valve.

3. In an apparatus of the class described, a housing, alined drive and driven shafts extending into the housing, a circular body carried by the drive shaft and having an annular cam on its rear face, a second circular body carried by the driven shaft and having its front face located adjacent the rear face of the first body, said second body having a pair of oppositely arranged cylinders therein, one end of each of which opens out through the front face of the body, the other ends of the cylinders being closed, a pair of closed conduits connecting said last mentioned ends of the cylinders together, said conduits containing fluid, a piston in each cylinder having an end projecting from the open end of the cylinder and engaging the cam, a manually-operated valve for controlling one conduit and a governor-operated valve controlling the other conduit, said housing containing fluid, scoop means carried by the second body, pump means for pumping the fluid scooped up by such scoop means into the conduits and a release valve for causing the fluid from the pump to flow back into the housing when the conduits are full.

MANUEL F. PERRY, Jr.